UNITED STATES PATENT OFFICE.

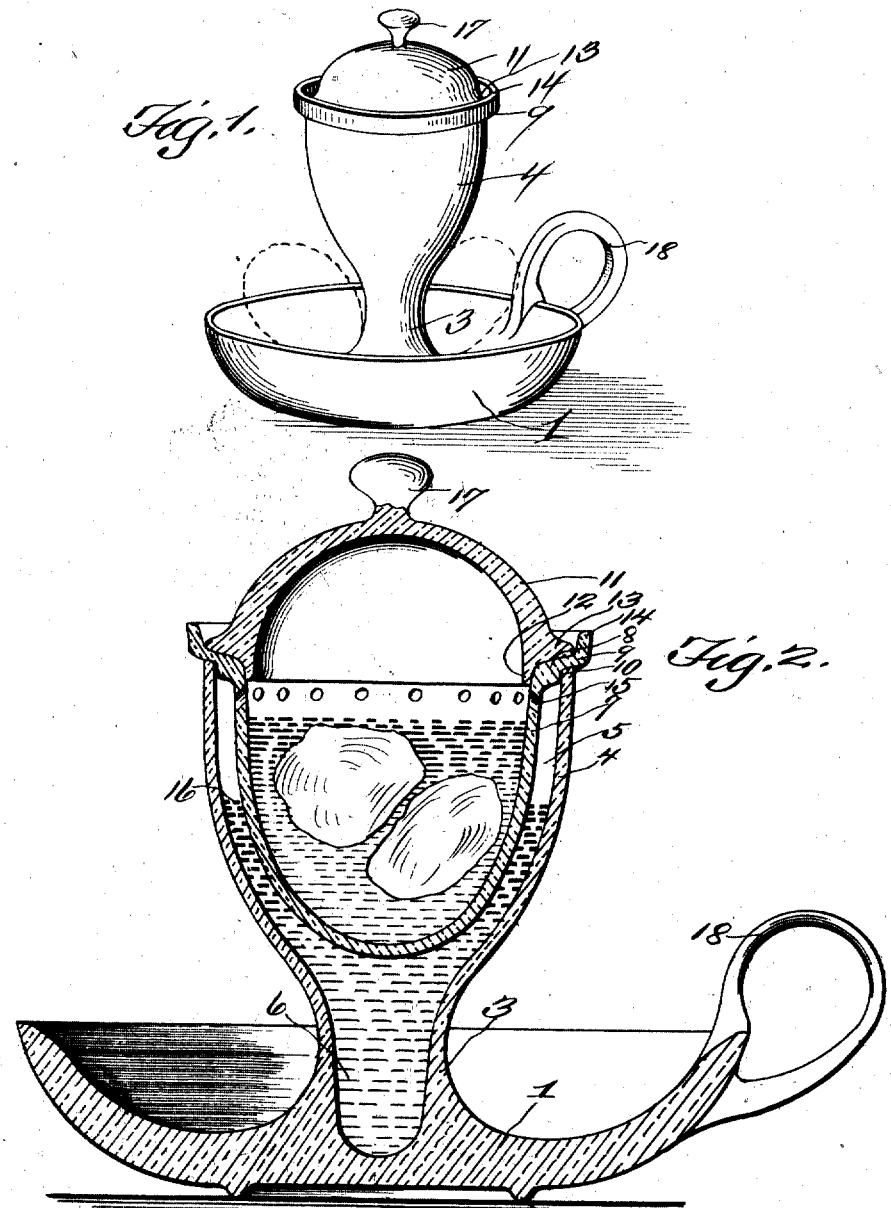

GERTRUDE SMITH FURRY, OF VALDOSTA, GEORGIA.

HOT-WATER OR STEAM HEATING EGG-CUP.

1,229,739.

Specification of Letters Patent. Patented June 12, 1917.

Application filed November 15, 1916. Serial No. 131,530.

*To all whom it may concern:*

Be it known that I, GERTRUDE SMITH FURRY, a citizen of the United States, residing at Valdosta, in the county of Lowndes, State of Georgia, have invented a new and useful Hot-Water or Steam Heating Egg-Cup; and I do hereby declare the following to be a full, clear, and exact description of the invention, such as will enable others skilled in the art to which it appertains to make and use the same.

This invention relates to the art of cooking, kitchen and table utensils, and particularly to an improved hot water or steam heating egg cup, and one of the objects of the invention is to provide a device of this kind in which simple, improved and practical features of construction are involved.

Another object of the invention is to provide a device of this kind having a saucer shaped base for the reception of the eggs before broken, and having means rising upwardly from the saucer shaped base for the reception of a receptacle into which the yokes and whites of one, two or three eggs may be broken, there being a space for the reception of extremely hot water, which will keep the eggs warm or hot, and further cook the eggs before they are eaten, said receptacle being removable so that the hot water may be poured into said space, or replenished.

A further object of the invention is to provide a series of perforations in the wall of said receptacle (which is provided with a cover) so that the steam may enter said receptacle, and further heat the eggs.

In practical fields, the details of construction may necessitate alterations falling within the scope of what is claimed.

The invention comprises further features and combination of parts as hereinafter set forth, shown in the drawings, and claimed.

In the drawings:—

Figure 1 is a view in perspective of the improved hot water steam heating egg cup constructed in accordance with the invention.

Fig. 2 is a vertical sectional view.

Referring more especially to the drawings, 1 designates a base, which may be of any suitable shape or configuration, preferably substantially resembling the shape of a saucer, the bottom of which is provided with the usual supporting annular ridge or rib 2. Rising upwardly from the base centrally thereof, and constructed integrally with the base, is a neck portion 3, which merges or swells outwardly into a substantially egg shaped body 4, which is hollow, as shown at 5, the hollow extending into the neck, as shown at 6. A substantially egg shaped receptacle 7 is provided, which is fitted within the body 4. The upper part of the receptacle 7 is provided with an annular flange 9 angular in cross section. The under portion of the substantially horizontal part 8 of said angular flange 9 is provided with an annular shoulder 10, which engages the inner surface of the body 4 adjacent its upper peripheral edge, while said edge is engaged by the part 8 at a point beyond said shoulder 10. The receptacle 7 is provided with a cover 11, substantially of a shape resembling the butt of an egg, and the lower part of this cover is substantially angular in cross section, having an inner flange 12 and an outwardly extending flange 13. The part 12 is entitled an inner flange by reason of its engaging the inner face of the receptacle 7, while the part 13 is entitled an outer flange owing to its engagement with the upper surface of the part 8. The part or flange 13 engages on the interior of the substantially vertical part 14 of the angular flange 9. By this construction of joint between the cover and the receptacle 7, the escape of steam from the receptacle 7 is prevented. The receptacle 7 adjacent the angular flange 9 is provided with a series of perforations 15 arranged annularly, so that the steam rising from the hot water may pass into the receptacle 7, therefore collect under the cover 11, and assist materially in keeping the eggs or the like heated. It is to be noted that the shoulder 10 is so spaced from the outer surface of the receptacle 7, as to afford a space 16 between the receptacle and the inner surface of the body 4, so that the hot water and steam may surround substantially the greater portion of the bottom of the receptacle 7, in order to supply considerable heat to the egg. The cover 11 is provided with an integral knob 17, whereby the cover may be removed. The base 1 on its interior is so shaped relative to the neck 3 as to receive eggs, before they are broken, as shown in Fig. 1. The base is provided with a suitable handle 18, whereby the cup may be conveniently handled. The egg cup or heater may be placed over any suitable heater, such as an alcohol lamp or an electrical heater or the like for heating the water. By means of the hollow neck (into which the hot water extends) the eggs which may be placed in the base 1 may be kept heated. It is noted that the base 1 is so shaped as to receive and hold eggs. In other words, the outwardly and upwardly curved part of the base constitutes means to retain the eggs in the base. It is to be noted that the body 4 swells outwardly over the eggs that may be placed in the base, as shown in dotted lines in Fig. 1.

The invention having been set forth, what is claimed as new and useful, is:—

In a heating egg cup, a base formed to receive eggs, a hollow neck rising upwardly and centrally therefrom and formed integrally therewith and swelling outwardly into a substantially egg shaped hollow body open at its top, an egg receptacle corresponding in shape with and removably fitting into said body, and having means at its upper portion to support the same on the body in spaced relation thereto, and a cover for the receptacle.

In testimony whereof I have signed my name to this specification in the presence of two subscribing witnesses.

MRS. GERTRUDE SMITH FURRY.

Witnesses:
LEILA CONKLING,
JAMES CONKLING.